US008348336B2

(12) United States Patent
De Bie

(10) Patent No.: US 8,348,336 B2
(45) Date of Patent: Jan. 8, 2013

(54) SUNROOF FOR A VEHICLE

(75) Inventor: Sander De Bie, Nuth (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 13/086,983

(22) Filed: Apr. 14, 2011

(65) Prior Publication Data

US 2011/0254324 A1 Oct. 20, 2011

(30) Foreign Application Priority Data

Apr. 14, 2010 (EP) ..................................... 10159883

(51) Int. Cl.
*B60J 7/00* (2006.01)

(52) U.S. Cl. ... 296/211; 296/213; 296/214; 296/220.01; 296/222; 136/291

(58) Field of Classification Search .................. 296/211, 296/213, 214, 220.01, 222; 136/291
See application file for complete search history.

(56) References Cited

U.S. PATENT DOCUMENTS

| | | | |
|---|---|---|---|
| 4,911,496 A * | 3/1990 | Fuerst | 296/220.01 |
| 4,934,753 A | 6/1990 | Gajewski | |
| 5,154,481 A | 10/1992 | Paetz | |
| 5,261,722 A * | 11/1993 | Staley et al. | 296/211 |
| 6,155,635 A | 12/2000 | Wecker | |
| 6,331,031 B1 | 12/2001 | Paetz | |
| 6,439,654 B1 | 8/2002 | Teschner | |
| 6,485,090 B1 * | 11/2002 | Patz et al. | 296/214 |
| 6,682,132 B1 | 1/2004 | Hahn | |
| 7,441,833 B1 * | 10/2008 | Pomeroy et al. | 296/216.06 |
| 2004/0189056 A1 | 9/2004 | Wilms | |

FOREIGN PATENT DOCUMENTS

| | | |
|---|---|---|
| DE | 19813324 A1 | 10/1999 |
| DE | 19937221 C1 | 9/2000 |
| DE | 29824997 U1 | 2/2004 |
| EP | 0436283 A2 | 7/1991 |
| EP | 0997332 A2 | 5/2000 |
| EP | 1442907 A2 | 8/2004 |

OTHER PUBLICATIONS

European Search Report of the European Patent Office Patent Office in counterpart foreign application No. 10159883.7 filed Apr. 14, 2010.

* cited by examiner

*Primary Examiner* — Dennis Pedder
(74) *Attorney, Agent, or Firm* — Steven M. Koehler; Westman, Champlin & Kelly, P.A.

(57) ABSTRACT

Aspects of the invention relate to sunroof for a vehicle having an opening in its fixed roof. The sunroof comprises a stationary part to be attached to the vehicle, and at least a front closure member and a rear closure member, movably supported by the stationary part. The closure members are movable between a closed position within the roof opening and an open position in which they are moved at least partly away from the roof opening. An intermediate member is supported by the stationary part in the area of the rear end of the front closure member and the front end of the rear closure member when they are in their closed position. An electrical part on each of the closure members requires electrical connections between each closure member and the stationary part. An electrical connection between the closure members is effected through the intermediate member, while the connection to the stationary part is effected through one of the intermediate member and closure members which has the least displacement with respect to the stationary part.

17 Claims, 5 Drawing Sheets

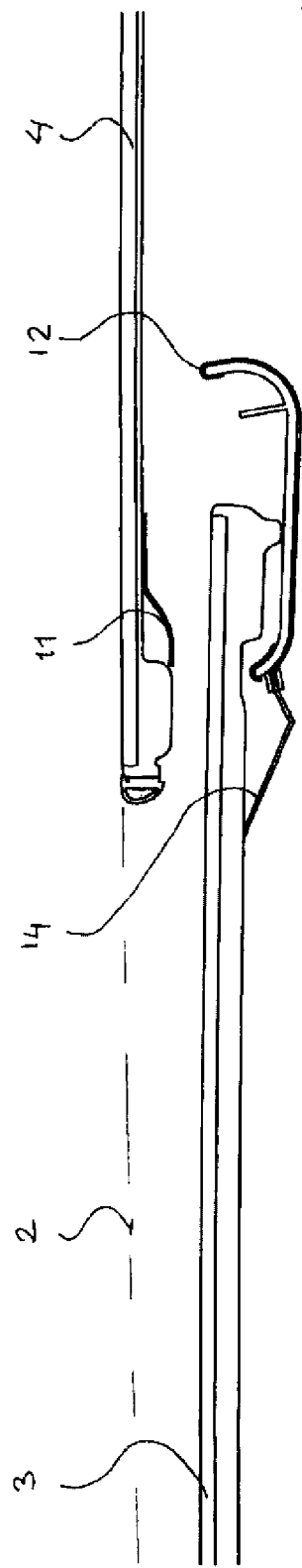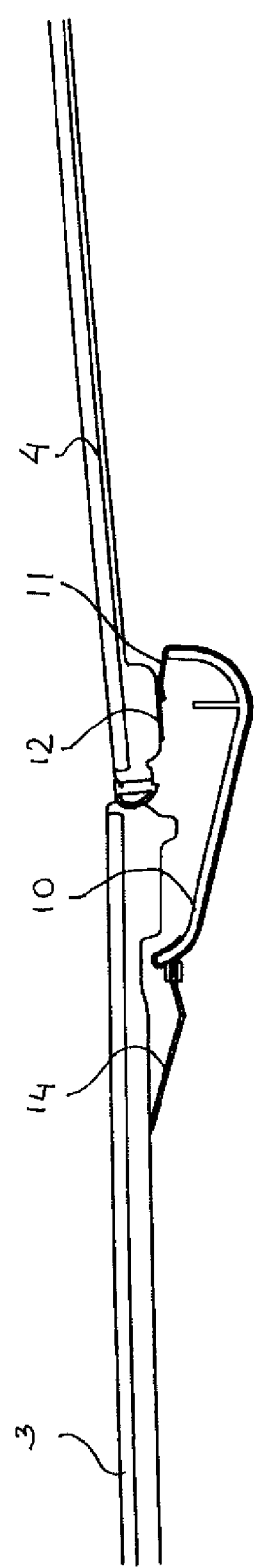

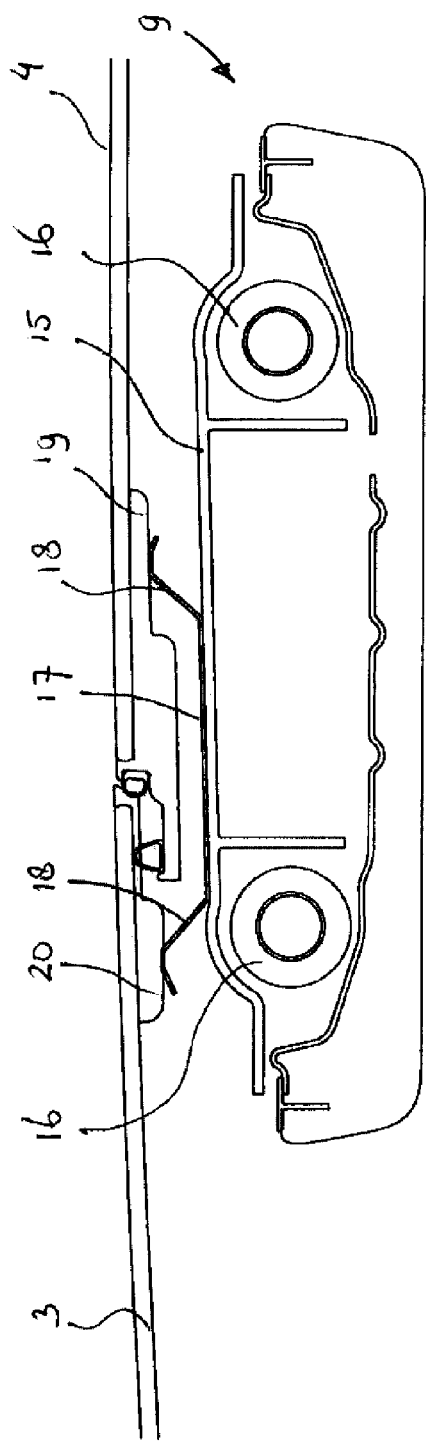
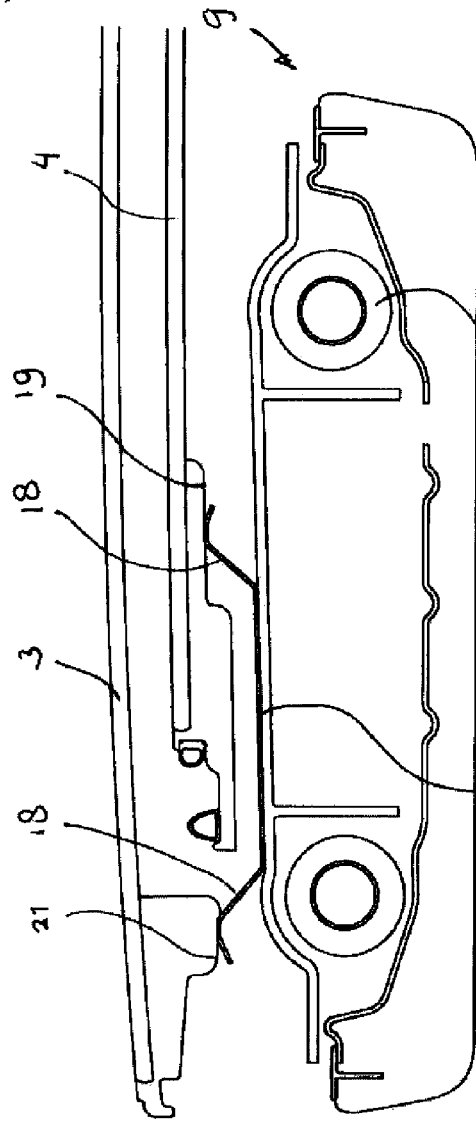

SUNROOF FOR A VEHICLE

BACKGROUND

The discussion below is merely provided for general background information and is not intended to be used as an aid in determining the scope of the claimed subject matter.

Aspects of the invention relates to a sunroof for a vehicle having an opening in its fixed roof, said sunroof comprising a stationary part attached to the vehicle and at least a front closure member and a rear closure member, movably supported by the stationary part, the closure members being movable between a closed position within the roof opening and an opened position in which they are moved at least partly away from the roof opening.

In the automotive industry there is a trend towards integrating electrical parts in the closure members of a sunroof. The most remarkable example is the provision of solar cells on the closure members which normally consist of glass panels. In most cases, the electricity generated by the solar cells is used to load a battery, or to directly supply electricity to an electrical appliance, such as a fan. The battery or electrical consumer is provided on the stationary part of the sunroof or in the vehicle so that an electrical connection is required between the solar cells on the closure members and the stationary part of the sunroof. This poses a problem, particularly if the closure members are displaceable.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

An aspect of the invention makes use of an intermediary member which is supported by the stationary part, for instance in the area of the rear end of the front closure member and the front end of the rear closing member when they are in their closed position. The electrical connection between the closing members is effected through this intermediate member, while the connection to the stationary part is effected through one of the intermediate member and closure members which has the least displacement with respect to the stationary part.

By the use of the intermediate member, it is made possible to have only one electrical connection to the stationary part for both closure members. Normally such intermediate member is already present in the sunroof, for example in the form of a drain channel or housing for roller sunscreens.

The closure members, for example in the form of rigid (glass or plastic) panels, may have various configurations and displacement modes. Dependent on these displacement modes, the most effective electrical connections can be chosen. For example, if the rear panel is only pivotable and the front panel is slidable downwardly and rearwardly together with the drain channel, then the electrical connection to the stationary part can be effected through the rear panel, while the electrical connection between the front panel and the rear panel via the drain channel can be effected at least if the front panel is in its front position. If the front panel is displaced rearwardly below the rear panel, then any solar cells on the front panel will catch less sunrays, less energy is produced anyhow.

In another embodiment, the intermediate member is stationary, and is either formed by a stationary drain channel or a housing for one or more roller sunscreens, for example. In such embodiment the electrical connection to the stationary part is simple if it is effected through the stationary intermediate member. A pivotable closure member, for example the rear closure panel, can then have a continuous electrical connection to the intermediate member, whereas the front closure member might have at least two contact points which enable an electrical connection between the front closure member and a contact point on the intermediate member in the closed position and at least one open position of the front closure member.

Further features and advantages from the aspects of the invention will follow from the description with reference to the drawings showing embodiments of the sunroof according to the invention by way of example.

BRIEF DESCRIPTION OF THE DRAWINGS

FIGS. 4-6 are views corresponding to that of FIG. 3 but showing the sunroof panels in different positions.

FIG. 7 is a view corresponding to that of FIG. 3, but showing a variation of this embodiment, and in a position with the rear closure member opened.

FIGS. 8 and 9 are views corresponding to that of FIG. 3 but showing a second embodiment of the sunroof in two different positions.

DETAILED DESCRIPTION OF THE ILLUSTRATIVE EMBODIMENTS

Figure 1:
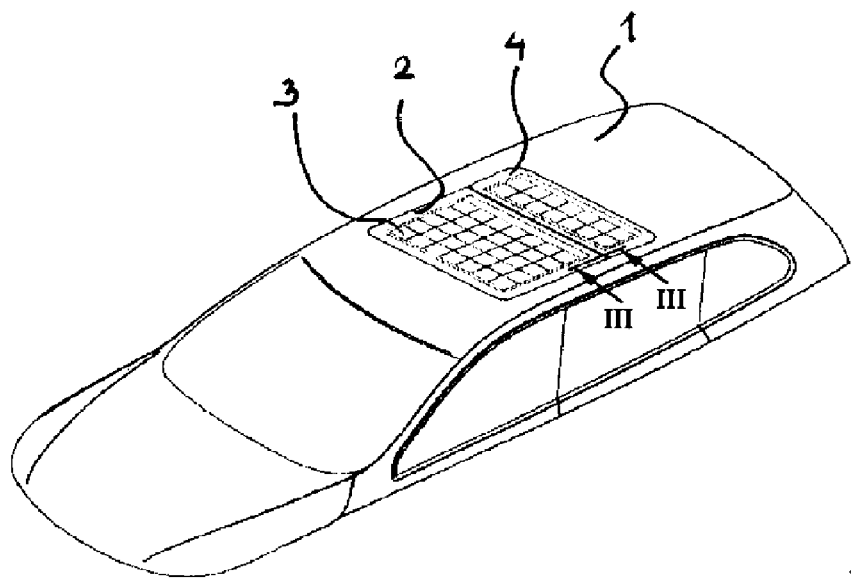
FIG. 1 is a perspective view of a part of a vehicle having in its fixed roof an embodiment of the sunroof.
Figure 2:
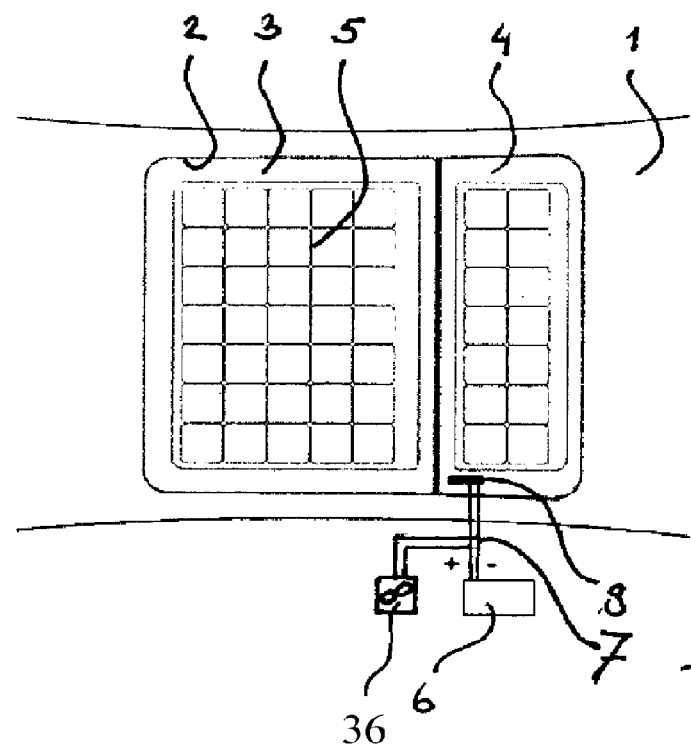
FIG. 2 is a schematic plan view of the fixed roof of the vehicle of FIG. 1.

FIGS. 1 and 2 partly show a vehicle, in this case a passenger car, which has in its fixed roof 1 one or more openings 2 which can be selectively opened or closed by a sunroof assembly having two or more closure member, in this case a front closure member 3 and a rear closure member 4 which are part of a sunroof. In the illustrative embodiment, the closure members 3, 4 are depicted in the form of rigid glass panels however this should not be considered limiting in that other forms of closure members can be used with aspects of the present invention. In the embodiment illustrated, the closure members 3,4 together close a single opening 2 but it is also conceivable that each closure member is part of its own sunroof assembly and is able to close its own roof opening. It is also possible that two closure members are arranged side by side in the fixed roof 1.

In FIGS. 1 and 2 it is shown that both closure members 3 and 4 are provided with solar cells 5 which are able to convert solar energy into electrical energy which should be supplied to an electrical consumer, either directly or through a battery 6. FIG. 2 indicates schematically the vehicle's wire harness 7 and a point of contact 8 between the rear closure member 4 and the wire harness 7. In this case the rear closure member 4 is a pivotable panel and the continuous electrical contact between rear closure member 4 and a stationary part of the sunroof, for example in the form of a frame 9 (partly shown in FIGS. 8 and 9) is easily effected at the front of the closure member where no or hardly any displacement of the rear closure member 4 takes place.

FIGS. 3-6 show how the electrical connection takes place between the front closure member and the rear closure member in order to lead the energy from both closing members 3, 4 to the battery 6.

FIGS. 3-6 show that the electrical connection between both closing members 3, 4 is effected through an intermediate member 10, here in the form of a transverse drain channel which is positioned below the rear end of the front closure member 3 and below the front end of the rear closure member 4 in order to be able to catch and drain any water there. The front closure member 3 is of the so called vent-slider type, which means that the front closure member 3 can be moved from its closed position within the roof opening 2 (FIG. 3) on the one hand to an upwardly inclined venting position (FIG. 4) and on the other hand to downwardly and rearwardly displaced open positions (FIGS. 5 and 6). The rear closure member 4 is movable from its closed position within the roof opening 2 (FIG. 3) only to an upwardly inclined venting position (see FIG. 7).

Figure 3:
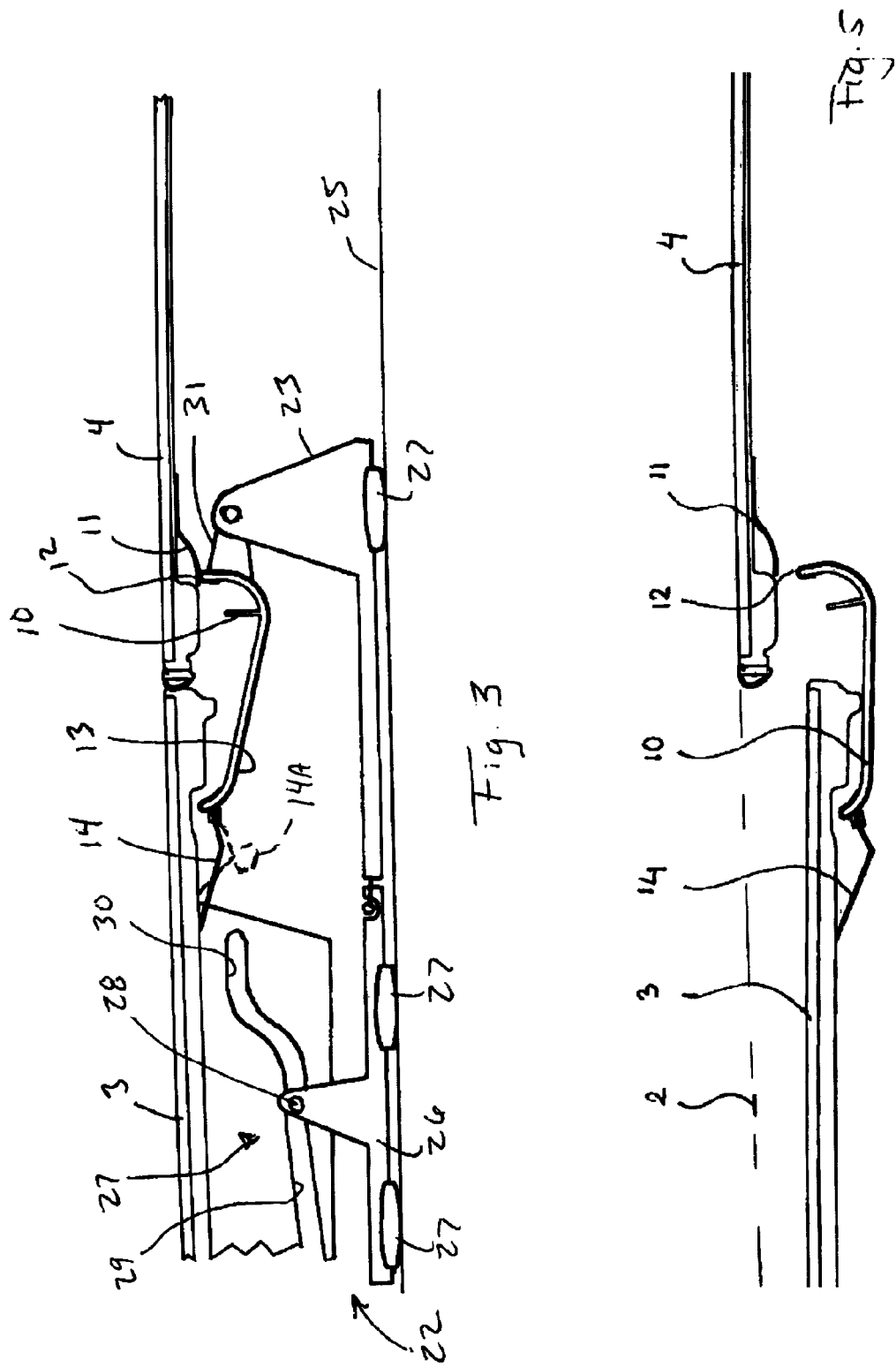
FIG. 3 is an enlarged sectional view according to the line III-III in FIG. 1.

It should be noted that operating mechanisms 22, 24 movably support closure members 3 and 4, respectively, on a stationary part such as a guide 25 secured to the fixed roof 1, which can also be formed from the fixed roof 1. The operating mechanisms 22, 24 are schematically illustrated herein since such mechanisms are well known, and moreover, particular constructions of such mechanisms are not necessary with respect to aspects of the present invention. For purposes of understanding, FIG. 3 schematically illustrates just operating mechanism 22 for panel 3, which also includes support(s) 23 for intermediate member 10, while FIG. 4 illustrates just operating mechanism 24 for panel 4.

Generally, operating mechanism 22 commonly includes driver slide(s) 26 that are guided in the guide 25 on each side of the movable panel 3 with slide shoes 27. The slide(s) 26 and support(s) 23 are driven by push-pull cables (not shown) connected to drive gears rotated by motors or hand cranks (not shown). The panel 3 is joined to each driver slide 26 using a pin/slot connection(s) 27 and/or with other pivoting or sliding lever(s) that control the movement of the panel 3 from the closed position of FIG. 3 to the venting position of FIG. 4, herein schematically represented by movement of pin 28 to slot portion 29, or the downwardly and rearwardly displaced position of the panel 3, herein schematically illustrated by movement of the pin 29 to slot portion 30.

Operating mechanism 22 further includes the support(s) 23 also guided upon guide 25. Support(s) 23 is joined to intermediate member 10 to control movement thereof through the various positions illustrated in FIGS. 2-6. Herein pivotable lever 31 schematically illustrates mechanisms to accomplish such movements.

Figure 4:
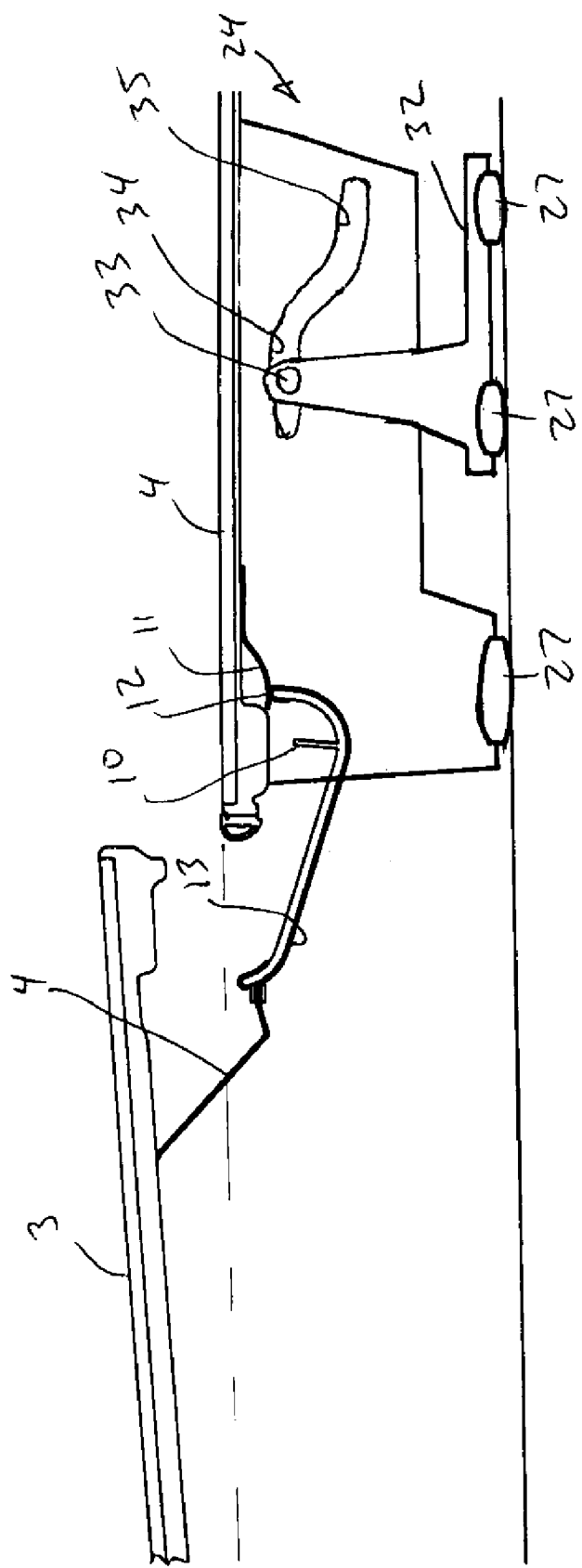

Operating mechanism 24 also can include a driver slide(s) 32 on each side of the panel 4 to control tilting movement of the panel 4 from the closed position of FIG. 2 or 4 when pin 33 is in slot portion 34 to the upwardly inclined position of FIG. 7 when pin 33 is in slot portion 35. Like driver slide(s) 26, driver slide(s) 32 is commonly driven by push-pull cables (not shown) connected to drive gears rotated by motors or hand cranks (not shown).

In FIG. 7, the rear closure member 4 is continuously connected electrically to the drain channel 10 by means of a spring contact 11 (for example a spring strip) arranged at the underside of the rear closure member 4, which is in contact with a contact area 12 of a conductor 13 provided on the drain channel 10. This electrical contact allows a pivoting movement of the rear closure member 4 while maintaining the electrical contact (see FIG. 7).

The front closure member 3 is connected to the conductor 13 of the drain channel 10 through a flexible electrical connection 14 which is for example formed by a coiled wire 14A (FIG. 3), a spring contact or other flexible member allowing a limited movement between the front closure member 3 and the drain channel 10. This movement is illustrated in FIGS. 3-5, but also a limited sliding movement between the front closure member 3 and the drain channel 10 would be possible.

FIGS. 5 and 6 illustrate that if the front closure member 3 is moved downwardly and rearwardly, the drain channel 10 moves together with the front closure member 3 and as a result thereof the contact between the drain channel 10 and the rear closure member 4 will be broken so that no electrical energy from the solar cells 5 on the front closure member 3 can be supplied to the rear closure member 4 and thus to the battery 6. This is however hardly any problem as the solar cells 5 on the front closure member 3 will catch less sunrays because at least some solar cells 5 are hidden below the rear closure member 4 and therefore deliver less electrical energy.

FIG. 7 illustrates a slight variation in the embodiment of FIGS. 3-6 in that the spring contact 11 is now provided on the drain channel 10 and cooperates with a contact area 12 at the underside of the rear closure member 4.

FIGS. 8 and 9 illustrate a further embodiment of a sunroof or roof assembly. In this embodiment the intermediate member is stationary and is formed by a housing 15 of roller sunscreen 16. This housing 15 is provided below the rear end of the front closure member 3 and the front end of the rear closure member 4. The housing 15 carries on its upper side an electrical conductor 17 having two spring contacts 18 enabling an electrical contact with contact areas on the front and rear closure members 3, 4 respectively. In FIGS. 8 and 9 it is shown that the front spring contact 18 can effect an electrical contact with a rear contact area 20 as shown in FIG. 8 and with a front contact area 21 on the closure member 3 as shown in FIG. 9. An electrical connection is thus effected in different positions of the front closure member 3 through different contact areas 20, 21. Of course it is conceivable that there are even more contact areas allowing an electrical connection in other positions as well.

Aspects of the invention is not limited to the embodiments shown in the drawings and described above and can be varied in different manners within the scope of the invention. For example, aspects of the different embodiments can be used in different combinations. It is possible that the closing members comprise an electrical consumer, such as a fan 36, instead of an energy source. The closure members can also have different configurations, such as folding members, rigid or flexible flaps and the like. Several roof openings may be present which are separated by roof sections or the like. More than two closure members may be provided, and also one or more fixed closure members. Closure members may make other movements from the closed position, such as forward movements, folding movements and the like. Also the intermediate member may make other or additional movements such as a downward movement and pivoting movement. The intermediate member may also be provided in another position, for example at the side of the closure members or between closure members arranged side-by-side.

The invention claimed is:

1. A sunroof for a vehicle having an opening in its fixed roof, comprising:
   a stationary part to be attached to the vehicle,
   at least a first closure member and a second closure member, supported by the stationary part, at least one of the closure members being movable between a closed position within the roof opening and an open position in which it is moved at least partly away from the roof opening, an intermediate member supported by the stationary part, electrical parts on the closure members configured to form an electrical connection between the closure members and an electrical connection to the stationary part, wherein the electrical connection between the closure members is effected through the intermediate member, while the electrical connection to the stationary part is effected through one of the closure members which has the least displacement with respect to the stationary part.

2. The sunroof of claim 1, wherein the second closure member is a pivotable closure panel.

3. The sunroof of claim 1, wherein the first closure member is slidable.

4. A sunroof for a vehicle having an opening in its fixed roof, comprising:

a stationary part to be attached to the vehicle, at least a first closure member and a second closure member, supported by the stationary part, at least one of the closure members being movable between a closed position within the roof opening and an open position in which it is moved at least partly away from the roof opening, an intermediate member supported by the stationary part, electrical parts on the closure members configured to form an electrical connection between the closure members and an electrical connection to the stationary part, wherein the electrical connection between the closure members is effected through the intermediate member, while the electrical connection to the stationary part is effected through the intermediate member and one of the closure members which has the least displacement with respect to the stationary part, and wherein at least a part of the one of the closure members is substantially stationary and is electrically connected to the stationary part, and wherein the other closure member is disconnectably connected to the one of the closure members through the intermediate member.

5. The sunroof of claim 4, wherein the second closure member is connected to the stationary part.

6. The sunroof of claim 1, wherein the electrical connection between the first closure member and the intermediate member is flexible so as to allow movement therebetween.

7. The sunroof of claim 6, wherein the first closure member is a panel that is pivotable to a venting position.

8. The sunroof of claim 6, wherein the flexible electrical connection between the first closure member and the intermediate member comprises a coiled wire and/or a spring contact.

9. The sunroof of claim 1, wherein the intermediate member and the second closure member have a contact area on one and a spring contact on the other.

10. A sunroof for a vehicle having an opening in its fixed roof, comprising:

a stationary part to be attached to the vehicle, at least a first closure member and a second closure member, supported by the stationary part, at least one of the closure members being movable between a closed position within the roof opening and an open position in which it is moved at least partly away from the roof opening, an intermediate member supported by the stationary part, electrical parts on the closure members configured to form an electrical connection between the closure members and an electrical connection to the stationary part, wherein the electrical connection between the closure members is effected through the intermediate member, while the electrical connection to the stationary part is effected through one of the intermediate member and the closure member which has the least displacement with respect to the stationary part, and wherein the intermediate member is movable with one of the closure members.

11. A sunroof for a vehicle having an opening in its fixed roof, comprising:

a stationary part to be attached to the vehicle, at least a first closure member and a second closure member, supported by the stationary part, at least one of the closure members being movable between a closed position within the roof opening and an open position in which it is moved at least partly away from the roof opening, an intermediate member supported by the stationary part, electrical parts on the closure members configured to form an electrical connection between the closure members and an electrical connection to the stationary part, wherein the electrical connection between the closure members is effected through the intermediate member, while the electrical connection to the stationary part is effected through one of the intermediate member and the closure member which has the least displacement with respect to the stationary part, and wherein the intermediate member is a transverse drain channel at a position below the rear end of the first closure member and the front end of the second closure member when they are in their closed position.

12. A sunroof for a vehicle having an opening in its fixed roof, comprising:

a stationary part to be attached to the vehicle, at least a first closure member and a second closure member, supported by the stationary part, at least one of the closure members being movable between a closed position within the roof opening and an open position in which it is moved at least partly away from the roof opening, an intermediate member supported by the stationary part, electrical parts on the closure members configured to form an electrical connection between the closure members and an electrical connection to the stationary part, wherein the electrical connection between the closure members is effected through the intermediate member, while the electrical connection to the stationary part is effected through one of the intermediate member and the closure member which has the least displacement with respect to the stationary part, and wherein the intermediate member being a drain channel which is slidable together with the first closure member to a position below the second closure member, the first closure member and the drain channel being permanently electrically connected, while the electrical connection between the drain channel and the second closure member is disconnectable.

13. A sunroof for a vehicle having an opening in its fixed roof, comprising:

a stationary part to be attached to the vehicle, at least a first closure member and a second closure member, supported by the stationary part at least one of the closure members being movable between a closed sostion within the roof opening and an open position in which it is moved at least partly away from the roof opening, an intermediate member supported by the stationary part, electrical parts on the closure members configured to form an electrical connection between the closure members and an electrical connection to the stationary part, wherein the electrical connection between the closure members is effected through the intermediate member, while the electrical connection to the stationary part is effected through one of the intermediate member and the closure member which has the least displacement with respect to the stationary part, and wherein the intermediate member is stationary, and is formed by a housing of one or more roller screens at a position below the rear end of the first closure member and the front end of the second closure member when they are in their closed position.

14. The sunroof of claim 3, wherein the front closure member has at least two contact areas which enable an electrical connection between the front closure member and a contact point on the intermediate member in the closed position and at least one open position of the front closure member.

15. The sunroof of claim 1, wherein the electrical part comprises solar cells for connection to a battery or an electrical consumer in the vehicle.

16. The sunroof of claim 4, wherein the intermediate member is supported in the area of the rear end of the first closure member and the front end of the second closure member when they are in their closed position.

17. The sunroof of claim 1, wherein the intermediate member is supported in the area between the first and second closure members when they are in their closed position.

* * * * *